UNITED STATES PATENT OFFICE.

JOHN RALSTON, ABRAHAM L. THOMAS, AND WILLIAM PARKINSON, FOR THEMSELVES, AND WILLIAM A. SHOEMAKER, OF SCHUYLKILL COUNTY, AND GEORGE E. BUCKLEY, OF PHILADELPHIA, PENNSYLVANIA, ASSIGNEES OF SAID RALSTON, THOMAS, AND PARKINSON.

IMPROVEMENT IN THE MANUFACTURE OF IRON AND STEEL.

Specification forming part of Letters Patent No. 88,208, dated March 23, 1869; reissue No. 3,775, dated December 21, 1869.

*To all whom it may concern:*

Be it known that JOHN RALSTON, ABRAHAM L. THOMAS, and WILLIAM PARKINSON, of the county of Schuylkill and State of Pennsylvania, did invent a new and useful Improvement in the Manufacture of Wrought-Iron and Steel; and the following is a full, clear, and exact description of the same.

The nature of said invention consists in using, in the puddling-furnace for making steel direct, or improved wrought-iron from pig or cast iron, a native iron ore which is found in certain localities in Pennsylvania and other places, and which may be described as a micaceous, gray, magnetic iron ore, and which was known in Pennsylvania, from the neighborhood in which it was found, as the Strickhauser ore. It is mineralogically composed of quartz and mica, mixed with micaceous hematite and magnetite, or magnetic iron ore. The ore generally has a laminated appearance, due to fine scales of yellowish, greenish-white mica. The greater proportion of the iron in this ore is present in the form of micaceous hematite.

A favorable locality for obtaining this ore is in the county of York, on a branch of Seven Valley creek, about two miles west of Hanover Junction, in a place known as Strickhauser's Bank, and extending on the north side of the valley, through which the Hanover Branch Railroad runs. It may be found also in other localities.

It is preferred to use ore unwashed, as it comes from the mine. This ore is placed or thrown into the puddling-furnace at the time of charging, and it is melted or fused with the cast-iron. When it is wished only to improve the quality of the wrought-iron to be produced, without making steel, about ten per cent. of the ore is found to be sufficient. When it is wished to produce steel in the puddling-furnace, from fifteen to twenty per cent. of the ore is sufficient.

The harder the pig-iron is, the greater percentage of ore should be used. It is preferred to use grades of cast-iron, known as No. 2, foundry-pig, and No. 3, foundry-pig. If the pig-iron has much sulphur or phosphorus, the proportion of ore should be increased.

In making steel, one to one and three-quarters of an hour is generally found sufficient, the metal being removed as soon as it can adhere and form balls and masses; and in working the furnace to make steel, the molten iron is kept under the cinder by the rubble as much as possible.

In producing wrought-iron, the molten metal is constantly turned up toward the flame, and the metal is allowed to remain in the furnace, say, ten to twenty minutes longer, and until it presents the usual appearance of wrought-iron brought to nature.

The advantages are, that a superior article of wrought-iron is produced in the one case, and in the other a superior article of steel, which welds easier than other steel, and which will take a temper similar to cast-steel.

What is claimed, and desired to be secured by Letters Patent, is—

1. The manufacture of an improved article of wrought-iron in the puddling-furnace, by using, in combination with molten cast-iron therein, the micaceous, gray, magnetic iron ore, substantially as described.

2. The manufacture of steel direct in the puddling-furnace, by using, in combination with molten cast-iron therein, the micaceous, gray, magnetic iron ore, substantially as herein described.

JOHN RALSTON.
ABRAHAM L. THOMAS.
WILLIAM PARKINSON.
WM. A. SHOEMAKER.
GEORGE E. BUCKLEY.

Witnesses:
W. H. BONYER,
H. B. GRAEFF,
W. A. A. MCKINLEY,
WM. J. BURNS.